United States Patent

Daubinger et al.

[11] Patent Number: 6,142,719
[45] Date of Patent: Nov. 7, 2000

[54] SELF-DRILLING SCREW

[75] Inventors: Gerd Daubinger; Horst Rahmsmdorf, both of Munich; Felix Ferlemann, Windach; Sven Jochmann; Daniel E. Spielberg, both of Aachen, all of Germany

[73] Assignee: Hilti Aktiengesellschaft, Schaan, Liechtenstein

[21] Appl. No.: 09/281,253

[22] Filed: Mar. 30, 1999

[30] Foreign Application Priority Data

Mar. 30, 1998 [DE] Germany .................. 198 14 128

[51] Int. Cl.[7] .................................................. F16B 25/00
[52] U.S. Cl. ................................. 411/387.8; 411/387.1
[58] Field of Search ........................ 411/387.1–387.8, 411/386, 411, 424

[56] References Cited

U.S. PATENT DOCUMENTS

| | | | |
|---|---|---|---|
| 3,395,603 | 8/1968 | Skierski | 411/387.8 |
| 3,517,581 | 6/1970 | Stokes | 411/387.8 |
| 3,578,762 | 5/1971 | Siebol . | |
| 3,665,801 | 5/1972 | Gutshall | 411/387.7 |
| 4,028,987 | 6/1977 | Wilson | 411/387.4 |
| 4,125,050 | 11/1978 | Schwartzman | 411/387.7 |
| 4,222,689 | 9/1980 | Fujiwara | 411/387.8 |
| 4,407,620 | 10/1983 | Shinjo | 411/387.7 |
| 4,586,862 | 5/1986 | Yamasaki | 411/387.8 |
| 4,645,396 | 2/1987 | McCauley et al. . | |
| 5,120,172 | 6/1992 | Wakai . | |

FOREIGN PATENT DOCUMENTS

| | | | |
|---|---|---|---|
| 2398211 | 2/1979 | France | 411/387.7 |
| 9314006 | 1/1994 | Germany . | |
| 1316157 | 5/1973 | United Kingdom | 411/387.8 |
| 1484567 | 9/1977 | United Kingdom | 411/387.8 |

*Primary Examiner*—Flemming Saether
*Attorney, Agent, or Firm*—Brown & Wood, LLP

[57] ABSTRACT

A self-drilling screw including a drilling section (1; 4) adjoining a thread section (2; 5) of the screw and formed of first (11; 41) and second (12; 42) parts arranged one after another, within the drilling section (1; 4) having first and second cutting edges (15, 16; 45, 46) a radial extension of which is symmetrical with respect to the longitudinal axis of the screw, in the first, in a drilling direction, part of the drilling section (1; 4), with at least a portion of the second part (12; 42) of the drilling section (1, 4), which is located between the first part (11, 41) and the thread section (2; 5), having in a region of one of the first cutting edges (15; 45), a radial extension (R1; R3) corresponding, at most, to a half of a root diameter (D1; D3) of the thread section (2; 5), and with the second cutting edge (16, 46) having in the second part (12; 42) of the drilling section (1, 4), a radial extension (R2; R4) which is smaller than a half of a pitch diameter (D2; D4) of the thread section (2, 5) and corresponds at least to the half of the root diameter (D1; D3) of the thread section (2; 5).

5 Claims, 2 Drawing Sheets

SELF-DRILLING SCREW

BACKGROUND OF THE INVENTION

1. Field of the Invention

The present invention relates to a self-drilling screw including a head, a thread section adjoining the head, and a drilling section adjoining the thread section and formed of first and second parts arranged one after another, with the drilling section having two, diametrically opposite, discharge grooves extending parallel to a longitudinal axis of the screw at least along a portion of a longitudinal extent of the drilling section, and first and second cutting edges, and with a radial extension of the first and second cutting edges being symmetrical with respect to the longitudinal axis of the screw in the first, in a drilling direction, part of the drilling section, with at least a portion of the second part of the drilling section, which is located between the first part and the thread section, having in a region of the second discharge groove, a radial extension corresponding, at most, to a half of a root diameter of the thread section.

2. Description of the Prior Art

Attachment elements, which are used for securing, e.g., a thin-wall metal constructional part to a constructional component formed as a metallic support, can be formed, e.g., as a self-drilling screw of a type described in European Publication EP-0 535 193. This self-drilling screw has a drilling section which forms a hole in the constructional part and in the metallic support, into which a thread section of the self-drilling screw can be screwed in.

The self-drilling screw has, beside the drilling and thread section, a head which adjoins the thread section at the side of the thread section opposite the drilling section, and which is provided, e.g., with drive surfaces engageable with a rotary tool. The drilling section has two, diametrically opposite, discharge grooves and two diametrically opposite, cutting edges, both extending substantially parallel to the longitudinal axis of the self-drilling screw. Both the discharge grooves and the cutting edges extend at least along a portion of the longitudinal extent of the drilling section. The discharge grooves and the cutting edges extend from the free end of the drilling section. The drilling section is formed of two, arranged one after another, parts, with the cutting edges being arranged, in the first, in the drilling direction, part symmetrically with respect to the longitudinal axis of the self-drilling screw, and with the second part of the drilling section having a diameter which is smaller than the root diameter of the thread section.

Because of the smaller diameter of the second part of the drilling section, no adequate side guidance is provided when the second part of the drilling section of the self-drilling screw passes through the holes formed in the constructional part and its support. This results in an inadequate centering of the following thread section because of, e.g., an eccentrical alignment of the self-drilling screw with respect to the holes, or can result in an inclination of the self-drilling screw relative to the outer surface of the constructional part. This can cause a radial expansion of the holes or damage of thread flanks during driving-in of the thread section. This adversely affects the holding value of the self-drilling screw in the construction part and its support.

Accordingly, an object of the present invention is to provide a self-drilling screw which would insure rapid setting of the self-drilling screw without a large expenditure of force, while providing for adequate guidance and centering of the drilling section.

SUMMARY OF THE INVENTION

This and other objects of the present invention, which will become apparent hereinafter, are achieved by providing the second cutting edge, in the second part of the drilling section, with a radial extension which is smaller than a half of the pitch diameter of the thread section and which corresponds at least to the half of the root diameter of the thread section.

The first part of the drilling section primarily contributes to the formation of holes in the constructional part and its support. A portion of the second cutting edge, which is located in the second part of the drilling section, contributes to the hole formation and/or is used for side guidance of the self-drilling screw in the holes.

In order to achieve a stable and uniform guidance of the self-drilling screw during the entire time the second part of the drilling section cooperates with the constructional part and its support, advantageously, the entire second part has, in the region of the first cutting edge, a radial extension which corresponds at most to the half of the root diameter of the thread section.

With a self-drilling screw in which, e.g., the first part of the drilling section serves for forming holes in the constructional part and its support, and the second part provides for side guidance of the self-drilling screw in the holes, advantageously, the radial extension of the cutting edges in the first part of the drilling section is smaller than a half of the pitch diameter of the thread section and is larger than the half of the root diameter of the thread section.

With a self-drilling screw in which, e.g., the first part of the drilling section serves for pilot-drilling of the holes in the constructional part and its support, and the second part serves for actually drilling the holes and sidewise guiding of the self-drilling screw in the holes, advantageously, the radial extension of the cutting edges in the first part corresponds at most to the half of the root diameter of the thread section.

To insure a good removal of drillings from the drilled holes, advantageously, both the discharge grooves and the cutting edges extend over the entire drilling section.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
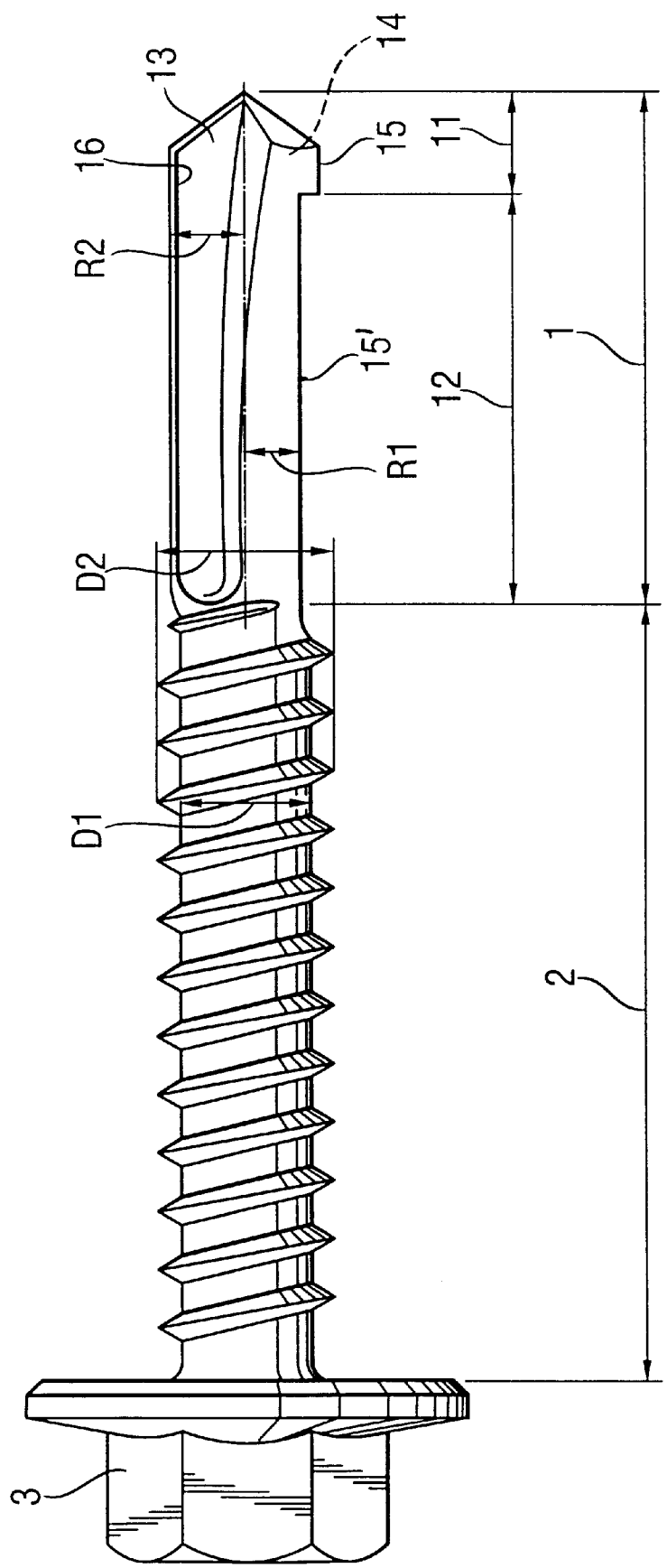
FIG. 1 shows a side perspective view of a first embodiment of a self-drilling screw according to the present invention.
Figure 2:
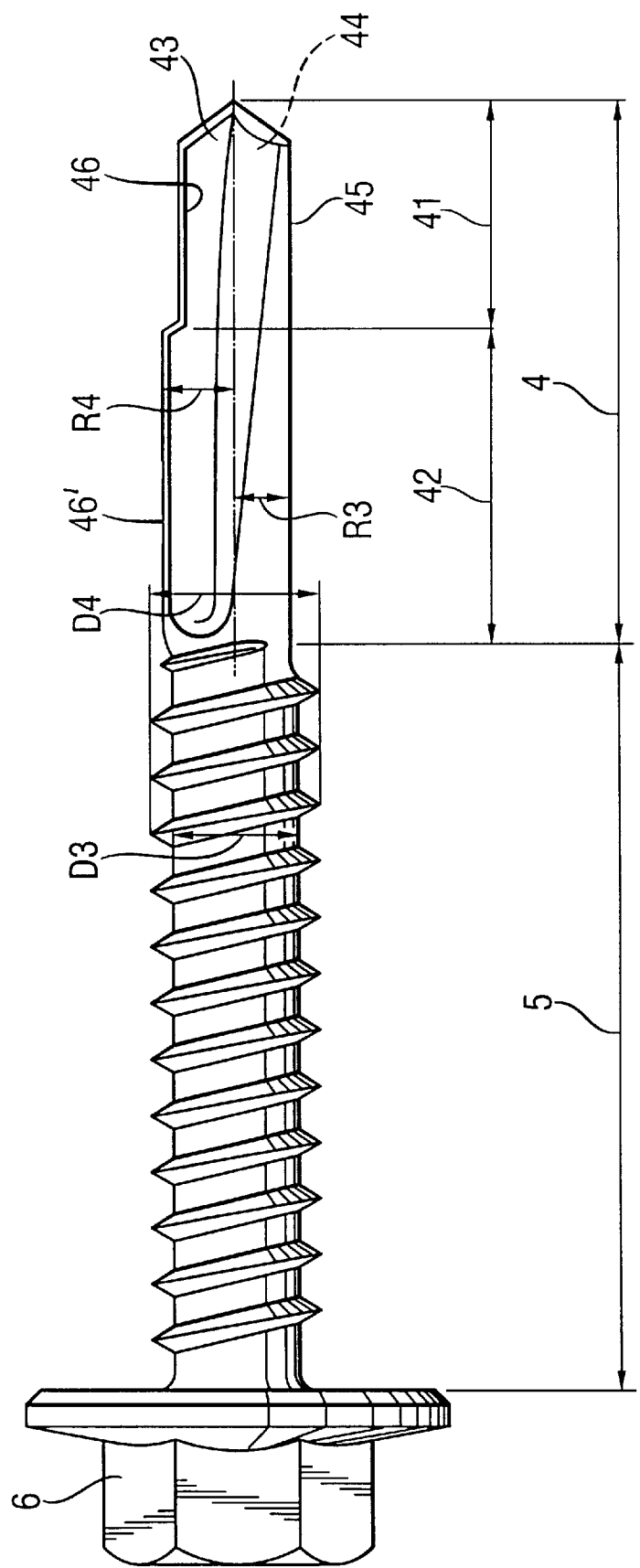
FIG. 2 shows a side perspective view of a second embodiment of a self-drilling screw according to the present invention.

A self-drilling screw according to the present invention, which is shown in FIGS. 1–2, has a head 3, 6, thread section 2, 5, and a drilling section 1, 4 which adjoins the thread section 2, 5, respectively. The drilling section 1, 4 of the self-drilling screw according to the present invention is formed of two parts 11, 12; 41, 42, respectively. The first part 11, 41 extends from the free end of the drilling section 1, 4 up to the second part 12, 42 which adjoins the thread section 2, 5, respectively.

The drilling section 1, 4 has two, diametrically opposite, discharge grooves 13, 14; 43, 44 and two, diametrically opposite cutting edges 15, 16; 45, 46, respectively. The first cutting edge 15 of the drilling section 1 extends only along the first part 11 of the drilling section 1 whereas the second edge 16 extends along the part 11, 12 of the drilling section 1. The edge 15' of the second part 12 of the drilling section 1, which is located inwardly of the first cutting edge 15 of the first part 11, is not a cutting edge. In the drilling section 4, it is the first cutting edge 45 that extends along both parts 41, 42 of the drilling section 4. The edge 46' of the second part 42 of the drilling section 4 is offset outwardly with respect to the cutting edge 46 in the first part 41. The discharge grooves 13, 14; 43, 44 and the cutting extend over the entire drilling section 1, 4, respectively. The cutting edges 15, 16; 45, 46 extend in the first part 11, 41 of the drilling section 1, 4 symmetrically with respect to the longitudinal axis of the self-drilling screw. The second part 12 of the drilling section 1 has, in the region of the non-cutting edge 15, a radial extension R1 which, at most, corresponds to a half of the root diameter D1 of the second section 2 and extends over the entire second part 12 of the drilling section 1. The second cutting edge 16 has, in the second part 12 of the drilling section 1, a radial extension R2, which is smaller than a half of the pitch diameter D2 of the thread section 2, and is larger than the half of the root diameter D1 of the thread section 2.

The second part 42 of the drilling section 4 has, in the region of the first cutting edge 45, a radial extension R3 which, at most, corresponds to a half of the root diameter D3 of the thread section 5 and extends over the entire drilling section 4, and has, in the region of the second part 46' of the second cutting edge 46, a radial extension R4 which is smaller than a half of the pitch diameter D4 of the thread section 5 and is larger than the half of the root diameter D3 of the thread section 5.

In the embodiment of a self-drilling screw shown in FIG. 1, the radial extension of the cutting edges 15, 16, in the first part 11 of the drilling section 1, is smaller than the half of the pitch diameter D2 and is larger than the half of the root diameter D1 of the thread section 2. In the embodiment of a self-drilling screw shown in FIG. 2, the radial extension of the cutting edges 45, 46, in the first part 41 of the drilling section 4, corresponds at most to the half of the root diameter D3 of the thread section 5.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A self-drilling screw, comprising a head (3; 6), a thread section (2, 5) adjoining the head (3; 6), and a drilling section (1; 4) adjoining the thread section (2; 5) and formed of first (11; 41) and second (12; 42) parts arranged one after another, the drilling section (1; 4) having first and second cutting edges (15, 16; 45, 46) and two, diametrically opposite, first and second discharge grooves (13, 14; 43, 44) extending parallel to a longitudinal axis of the screw at least along a portion of a longitudinal extent of the drilling section (1; 4) and associated with the second and first cutting edges (15, 16; 45, 46), respectively, wherein a radial extension of the cutting edges (15, 16; 45, 46) is symmetrical with respect to the longitudinal axis of the screw in the first, in a drilling direction, part (11, 41) of the drilling section (1; 4), wherein at least a portion of the second part (12, 42) of the drilling section (1, 4), which is located between the first part (11, 41) and the thread section (2; 5), has, in a region of the second discharge groove (14, 44), a radial extension (R1; R3) less than a half of a root diameter (D1; D3) of the thread section (2; 5), and wherein the second part (12, 42) of the drilling section (1, 4), has, in a region of the first discharge groove (13; 43) a radial extension (R2; R4) which is smaller than a half of the pitch diameter (D2; D4) of the thread section (2, 5) and is greater than the half of the root diameter (D1, D3) of the thread section (2; 5).

2. A self-drilling screw according to claim 1, wherein a radial extension of the two cutting edges (15, 16) in the first part (11) of the drilling section (1) is smaller than the half of the pitch diameter (D2) of the thread section (2) and corresponds at least to the half of the root diameter (D1) of the thread section (2).

3. A self-drilling screw according to claim 1, wherein the radial extension of the two cutting edges (45, 46) in the first part (41) of the drilling section (4) corresponds at most to the half of the root diameter (D3) of the thread section (5).

4. A self-drilling screw according to claim 1, wherein the discharge grooves (13, 14; 43, 44) extend over the entire drilling section (1; 2).

5. A self-drilling screw according to claim 1, wherein the entire second part (12, 42) of the drilling section (1, 4) has, in the region of the second discharge groove (14, 44) a radial extension (R1; R3) corresponding at most to the half of the root diameter (D1; D3) of the thread section (2; 5).

\* \* \* \* \*